(12) United States Patent
Joseph

(10) Patent No.: US 6,803,421 B2
(45) Date of Patent: Oct. 12, 2004

(54) HIGH FLOW FILLED PROPYLENE POLYMER COMPOSITIONS HAVING IMPROVED IMPACT AND DIMENSIONAL PROPERTIES

(75) Inventor: Sebastian Joseph, Mason, OH (US)

(73) Assignee: Equister Chemicals, LP, Houston, TX (US)

( * ) Notice: Subject to any disclaimer, the term of this patent is extended or adjusted under 35 U.S.C. 154(b) by 0 days.

(21) Appl. No.: 10/292,315

(22) Filed: Nov. 12, 2002

(65) Prior Publication Data

US 2004/0092631 A1 May 13, 2004

(51) Int. Cl.$^7$ ............................................. C08L 23/10
(52) U.S. Cl. ................. 525/240; 525/333.7; 525/333.8; 524/394; 524/230; 524/451
(58) Field of Search ........................................ 524/240

(56) References Cited

U.S. PATENT DOCUMENTS

| | | | |
|---|---|---|---|
| 3,144,436 A | 8/1964 | Greene et al. ............. 260/93.7 |
| 3,940,379 A | 2/1976 | Castagna et al. ........ 268/82.2 S |
| 4,061,694 A | 12/1977 | Castgna .................. 260/878 B |
| 4,535,125 A * | 8/1985 | McCullough, Jr. ............ 525/88 |
| 4,634,735 A | 1/1987 | Thiersault et al. ............. 525/88 |
| 5,017,714 A | 5/1991 | Welborn, Jr. .................. 556/12 |
| 5,250,631 A * | 10/1993 | McCullough, Jr. ........... 525/322 |
| 5,256,734 A | 10/1993 | Sugihara et al. ............... 525/98 |
| 5,391,618 A * | 2/1995 | Yamamoto et al. ............ 525/88 |
| 5,532,309 A * | 7/1996 | Fukui et al. ................. 524/451 |
| 5,567,759 A | 10/1996 | Taniguchi et al. .......... 524/451 |
| 5,576,374 A | 11/1996 | Betso et al. ................. 524/451 |
| 5,599,865 A * | 2/1997 | Koizumi et al. ............. 524/413 |
| 5,639,829 A | 6/1997 | Yamaguchi et al. ........ 525/240 |
| 5,681,897 A | 10/1997 | Silvis et al. ................. 525/150 |
| 5,688,866 A | 11/1997 | Silvis et al. ................. 525/127 |
| 5,744,535 A * | 4/1998 | Akagawa et al. ........... 524/451 |
| 5,747,576 A * | 5/1998 | Sobajima et al. ........... 524/451 |
| 5,763,534 A | 6/1998 | Srinivasan et al. ......... 525/240 |
| 5,856,406 A | 1/1999 | Silvis et al. ................. 525/240 |
| 5,985,971 A | 11/1999 | Srinivasan et al. ......... 524/425 |
| 5,998,524 A * | 12/1999 | Srinivasan et al. ......... 524/425 |
| 6,011,102 A * | 1/2000 | Shimojo et al. ............. 524/451 |
| 6,087,429 A * | 7/2000 | Yamamoto et al. ......... 524/451 |
| 6,207,754 B1 | 3/2001 | Yu ............................... 525/133 |
| 6,214,934 B1 * | 4/2001 | Moriya et al. ................ 525/89 |
| 6,320,009 B1 | 11/2001 | Nakano et al. ............. 526/351 |
| 6,399,707 B1 * | 6/2002 | Meka et al. ................. 525/191 |
| 6,429,250 B1 * | 8/2002 | Rohrmann ................... 524/451 |
| 6,441,081 B1 * | 8/2002 | Sadatoshi et al. ........... 524/451 |
| 6,642,312 B2 * | 11/2003 | Park et al. ................... 525/191 |
| 2002/0183434 A1 * | 12/2002 | McEnhill et al. ........... 524/451 |

FOREIGN PATENT DOCUMENTS

| | | | |
|---|---|---|---|
| EP | 0 228 543 A2 | 7/1987 | |
| EP | 0 490 353 A2 | 6/1992 | |
| EP | 0 531 054 A2 | 3/1993 | |
| GB | 1156813 | 8/1966 | |
| GB | 2 046 763 A | 11/1980 | |
| JP | 8-176393 * | 7/1996 | ........... C08L/53/00 |
| JP | 11-130924 A * | 5/1999 | ........... C08L/23/12 |
| JP | 11-130925 A * | 5/1999 | ........... C08L/23/12 |
| WO | WO 94/06859 | 3/1994 | |
| WO | WO 98/21275 A1 * | 5/1998 | ........... C08L/23/12 |

OTHER PUBLICATIONS

Ross, J.F., et al.: "An Improved Gas–Phase Polyproplene Process" Ind. Eng. Chem. Prod. Res. Dev., vol. 24, No. 1: pp. 149–154 (1985).

Yu, T.C.,: "Impact Modification of Polypropylenes with Exact Plastomers" presented at SPE 52nd ANTEC, San Franciso, CA (May, 1994) pp. 2439–2445.

Laughner, M.K., et al.: "Modification of High Flow Polypropylene by Ethylene/a–Olefin Elastomers Produced by Single Site Constrained Geometry Catalyst" 5 pages.

Seitl, E., et al.: "Innovative Plastics for the Bumper Industry" Kunststoffe Plast. Europe, pp. 50–53 (Aug., 1994).

* cited by examiner

Primary Examiner—David W. Wu
Assistant Examiner—Rip A Lee
(74) Attorney, Agent, or Firm—Gerald A. Baracka; William A. Heidrich

(57) ABSTRACT

High melt flow filled propylene polymer compositions suitable for injection molding are provided. The compositions are blends of propylene impact copolymer, high melt index plastomer and mineral filler.

12 Claims, No Drawings

HIGH FLOW FILLED PROPYLENE POLYMER COMPOSITIONS HAVING IMPROVED IMPACT AND DIMENSIONAL PROPERTIES

FIELD OF THE INVENTION

The present invention relates to filled propylene polymer blend compositions suitable for injection molding comprising a propylene-ethylene impact copolymer and an ethylene plastomer having melt flow rate greater than 10. The blends, and particularly visbroken blends, exhibit high flow and provide a desirable balance of impact properties and dimensional stability.

DESCRIPTION OF THE PRIOR ART

Two phase propylene copolymer resins comprised of an intimate mixture of a continuous phase of crystalline propylene homopolymer and dispersed rubbery phase of ethylene-propylene copolymer are well known and widely used for numerous applications. While these so-called impact polypropylene products can be produced by melt compounding the individual polymer components, existing multi-reactor technology makes it possible to directly produce these products. This is conveniently accomplished by polymerizing propylene in a first reactor and discharging the polypropylene homopolymer from the first reactor into a secondary reactor where propylene and ethylene are copolymerized in the presence of the homopolymer. Gas-phase polymerizations of this type are described in the article by Ross, et al. al., "An Improved Gas-Phase Polypropylene Process." *Ind. Eng. Chem. Prod. Res. Dev.* 1985, 24, pp. 149–154. This gas-phase technology has been extended to products containing significantly higher rubber/elastomer contents which are referred to as in-situ thermoplastic polyolefins (TPOs).

The high rubber content PP-EPR materials produced by these in-reactor processes are increasingly being used by the automotive industry for the manufacture of injection molded large parts such as bumpers, body side mouldings and the like. Primary requirements for materials used for these applications are good impact and high dimensional stability, i.e., low coefficient of linear thermal expansion (CLTE). The need for bumper materials having reduced expansion or "O-gap" and the ability to significantly improve the expansion coefficient using mineral fillers is discussed by E. Seitl, et al., *Kunstoffe Plast Europe*, August 1994, pp. 50–53. The reference further notes that the expansion coefficient also influences the shrinkage. Shrinkage is an important consideration in the injection molding process since tools/molds are designed for a certain shrink requirement.

Ethylene-olefin elastomeric copolymers (plastomers) are known to be useful modifiers for polypropylene impact copolymers. The addition of plastomers makes it possible to obtain blends with enhanced properties, such as improved low temperature ductility. This latter feature is important since most manufacturer specifications now also have ductile-brittle failure mode requirements in addition to low temperature (−30° C. or −40° C.) impact requirements. For high flow injection molding polypropylene compositions there are also certain melt flow rate (MFR) requirements if acceptable fabrication is to be achieved.

U.S. Pat. No. 6,399,707 discloses polypropylene impact copolymer blends with low melt index (MI) plastomers, i.e., plastomers with MIs from 0.8 to 10 g/10 min and, more preferably, 0.8 to 3.5 g/10 min. The reference points out that while higher MFR (>15 g/10 min) materials are desirable for injection molding, it is difficult to achieve the low temperature ductility and impact properties required by the automotive industry with such high MFR resins. For this reason resin blends having MRFs less than 15 g/10 min are used.

It would be highly advantageous if polypropylene impact copolymer/plastomer blends having higher MFRs with acceptable impact and low temperature ductility were available. These and other benefits are achieved with the improved compositions of the invention which are described in detail to follow.

SUMMARY OF THE INVENTION

The present invention provides propylene polymer compositions suitable for injection molding. More specifically, the compositions are blends of ethylene-propylene impact copolymers, ethylene-olefin plastomers and mineral fillers. They are characterized by having high flow and a desirable balance of impact and dimensional properties.

The compositions are blends comprised of 45 to 90 weight percent (wt. %), based on the total composition, propylene-ethylene copolymer comprised of crystalline and amorphous phases, said copolymer having an ethylene content from 5 to 25 wt. % and MFR from 10 to 60 g/10 min; 5 to 35 wt. %, based on the total composition, ethylene-$C_{4-8}$ α-olefin plastomer, said plastomer having a density less than 0.92 g/cm$^3$ and MI from 12 to 50 g/10 min; and 5 to 40 wt. %, based on the total composition, mineral filler. MFRs of the compositions will range from 20 to 60 g/10 min and, more preferably, are from 25 to 50 g/10 min. In one highly useful embodiment of the invention, the above-described MFRs are achieved by visbreaking lower MFR blends of the components. Typically blends which are visbroken have initial MFRs less than 20 g/10 min. Visbreaking is particularly advantageous when MFRs of the initial blend are 15 g/10 min or less.

Preferably the improved compositions of the invention are talc-filled and contain 0.01 to 1 wt. % blending aid. Ethylene-octene-1 copolymers having densities from 0.86 to 0.90 g/cm$^3$ and MIs from 20 to 40 g/10 min are particularly useful plastomers for the inventive blends.

DETAILED DESCRIPTION

The propylene polymer compositions of the invention are high flow blends of impact copolymer, plastomer and filler useful for injection molding applications. The high flow compositions are particularly suitable for the manufacture of injection molded parts which require high impact, low temperature ductility and dimensional stability, such as exterior automobile components. It is generally recognized that attempting to increase flow rates of injection molding blend resins by using higher MFR propylene impact copolymers adversely affects impact resistance. On the other hand, if the amount of plastomer is increased to compensate for the impact loss, the flow rate is adversely affected.

By high flow is meant compositions, having MFRs 20 g/10 min or greater, most commonly, from 20 to 60 g/10 min. Resins having MFRs in the range 20 to 60 g/10 min are, from the standpoint of fabrication, considered to be highly suitable for use in injection molding equipment. MFRs referred to herein are determined in accordance with ASTM D 1238 at 230° C. and 2.16 Kg load. In those instances where the MI is specified, the MI is determined using test method ASTM D 1238 at 190° C. and 2.16 Kg load.

From the standpoint of product performance for the above-referenced automotive applications, impact properties and the ability to control expansion and contraction of the parts during production and end use are paramount. For obvious reasons performance criteria include impact strength requirements. In recent years, however, cold impact resistance of the material determined using an instrumented impact test and the type of failure mode (brittle-ductile) have become increasingly important material performance specifications for manufacturers. These test procedures will be described in more detail to follow.

Dimensional stability, as referred to herein, relates to both the expansion/contraction characteristics of the material after it is molded and the shrink characteristics of the material during fabrication. The former is determined by measuring the coefficient of linear thermal expansion in accordance with ASTM test method E 831. Shrinkage is determined by observing the difference in size of a molded plaque from the mold dimensions after the plaque has been allowed to stand, typically for 24 hours.

The ability to balance all of the aforementioned properties of an injection molding resin to achieve the optimal balance of properties, i.e. optimize each of the properties without unduly sacrificing the performance of any one property, is highly desirable. Furthermore, the ability to vary individual properties by judicious modification of the injection molding resin composition is equally advantageous. These objectives are accomplished with the blend compositions of the present invention by varying the amount and type of propylene impact copolymer and/or plastomer used and, optionally, visbreaking the filled impact copolymer/plastomer blend.

Propylene polymers used for the compositions of the present invention are propylene-ethylene copolymers comprised of crystalline (propylene homopolymer) and amorphous or rubber (ethylene-propylene copolymer) phases. Ethylene contents of the propylene-ethylene copolymers will range from 5 to 25 wt. % and, more preferably, from 6 to 22 wt. %. MFRs will range from 10 to 60 g/10 min and, more preferably, from 15 to 40 g/10 min. Ethylene-propylene rubber contents will range from about 10 to about 50 wt. %.

Useful propylene-ethylene copolymers employed for the invention, also referred to herein as impact copolymers, are known and may be obtained by physically blending a propylene homopolymer with the requisite amount of ethylene-propylene rubber. They are, however, preferably produced using gas-phase, stirred-bed polymerization processes. These processes utilize two reactors connected in series and high activity supported transition metal catalysts. In such processes, reactor-made intimate mixtures of propylene homopolymer and propylene-ethylene copolymer are produced.

More specifically for such processes, propylene is homopolymerized in a first reactor at a temperature from 50° C. to 100° C. and pressure from 250 psig to 650 psig utilizing a titanium catalyst and an organoaluminum cocatalyst. Preferably the temperature in the first reactor will be from 50° C. to 90° C. and the pressure will range from 300 psig to 450 psig. The highly isotactic homopolymer produced in the first reactor is then directly fed to a second reactor which is maintained at 25° C. to 80° C. and 100 psig to 500 psig where propylene and ethylene are copolymerized in the presence of the homopolymer. The amount of ethylene employed in the second reactor is sufficient to produce the copolymer with rubber-like characteristics. Polymerization in the second reactor is generally accomplished without additional catalyst; however, it may be advantageous to introduce more catalyst to the second reactor. If more catalyst is employed, it can be the same as the catalyst used in the first polymerization or different. Preferably, the second polymerization reactor is operated at 40° C. to 70° C. and 100 psig to 350 psig. A high activity titanium catalyst activated by contact with an organoaluminum cocatalyst is utilized for these polymerizations. The polymerizations are carried out in the substantial absence of liquid reaction medium and gas velocity within the stirred-bed is maintained below the onset of fluidization. Depending on their compositional makeup, gases can be recirculated through external heat exchanges for cooling or partially condensed. Cooled monomer is recirculated into the reactor and provides thermal control. Recirculated monomer vaporizes when it is introduced into the reactor so that polymerization occurs in the gas phase. In the preferred mode of operation, i.e., stirred, fixed-bed gas phase, the first and second reactors are fitted with spiral agitators to maintain a turbulent mechanically fluidized bed of polymer powder and prevent agglomeration.

Each reactor typically has its own control system(s) and is capable of independent operation. In the usual conduct of the process, propylene and ethylene monomers are passed through desiccant beds prior to introduction. Means are usually provided to individually meter the propylene, ethylene, hydrogen for molecular weight control, catalyst and cocatalyst. This makes it possible to more readily control and maintain the desired reactor conditions. If desired, monomer may be injected into the recirculated gas stream for introduction into the system. Residence times in both reactors are on the order of 1 to 4 hours.

The use of dual or cascading reactors for the homopolymerization and copolymerization of propylene and ethylene to produce ethylene copolymers is known. Similarly, gas-phase polymerizations utilizing stirred, fixed beds comprised of small polymer particles are also known. For additional information regarding gas-phase polymerizations and a schematic flow diagram of the process, reference may be made to the article by Ross, et al., in *Ind. Eng. Chem. Prod. Res. Dev.*, 1985, 24, pp 149–154, which is incorporated herein by reference.

The improved compositions of the invention have 45 to 90 wt. % of the propylene-ethylene copolymer blended with the plastomer and filler. Particularly useful products are obtained when the propylene impact copolymer constitutes 55 to 75 wt. % of the injection molding composition. Weight percentages of the impact copolymer and other blend components are based on the weight of the total composition.

Combined with the propylene impact copolymer to obtain the improved blend compositions of the invention is 5 to 35 wt. % and, more preferably, 10 to 30 wt. % of a plastomer or plastomer blend. The plastomer component is an ethylene based polymer, i.e., a polymer having ethylene as the major constituent, prepared using a metallocene catalyst. Metallocene or "single site" catalysts having at least one cyclopentadienyl or analogous ligand coordinated to a transition metal cation as well as plastomers produced using such catalyst systems are known. Metallocene catalysts and polymerization processes are described in U.S. Pat. Nos. 5,017,714 and 5,324,820 which are incorporated herein by reference.

Useful plastomers for the invention are copolymers of ethylene and $C_{4-8}$ α-olefin comonomers. Ethylene generally comprises from about 87 to about 97.5 mole % with the α-olefin comprising from about 2.5 to 13 mole % of the plastomer. The plastomers will have densities less than 0.92 g/cm³ and, more typically, from 0.86 to 0.92 g/cm³. Most preferably the plastomer densities will be from 0.86 to 0.90 g/cm³. Plastomer copolymers are described in more detail in U.S. Pat. No. 6,207,754 which is incorporated herein by reference.

The ethylene-α-olefin plastomers will have MIs from 12 g/10 min up to about 50 g/10 min. In a highly useful embodiment of the invention the plastomer MI will be from 20 to 40 g/10 min. Copolymers of ethylene and butene-1, hexene-1 and octene-1 are highly useful plastomers. Such plastomers are available from commercial sources. A particularly useful plastomer with density and MI within the above-recited ranges is an ethylene-octene-1 copolymer sold under the designation EG8407 (DuPont Dow Elastomers).

The use of plastomers as modifiers to increase impact strength and lower the brittle-ductile transition temperature of propylene copolymers is known; however, plastomers heretofore used have been low MI materials. Plastomers disclosed in the prior art have typically had MIs of 10 g/10 min or below and, more commonly, from about 1 to 5 g/10 min. The use of higher MI plastomers would be considered to be undesirable based on the generally recognized view that increasing the melt flow of polypropylene blends is detrimental to impact properties.

A mineral filler is included with the impact copolymer and plastomer. The filler will constitute 5 to 40 wt. % and, more preferably, 10 to 25 wt. % of the blend composition. Any of the conventional filler materials typically used with polyolefins can be employed. Such fillers can include calcium carbonate, clay, talc, kaolinite, wollastonite, pyrophillite, magnesium hydroxide, oxides of zinc and magnesium, silica and silicates, and the like.

The use of talc fillers is highly advantageous for the compositions of the invention. Useful talcs may be untreated or surface treated in accordance with known procedures. Talc surface treatments may include treatments with silanes, fatty acids, fatty acid metal salts or the like. Filler particle sizes may vary; however, it is generally preferred to utilize fillers having average particles sizes from about 0.5 to about 10 microns. Talc having an average particle size between about 0.5 and 2.5 microns is particularly useful for formulating the compositions of the invention.

The compositions of the invention may also contain optional additives commonly used for the formulation of propylene polymer resins. These additives include but are not limited to processing aids, antioxidants, heat stabilizers, UV absorbers, dispersants, crystallization accelerators, antistatic agents, lubricants and the like. The total amount of additives used will not exceed about 5 wt. % of the composition and, most preferably, will range between about 0.01 and 2.5 wt. %.

In one highly useful embodiment of the invention, the compositions will contain 0.01 to 1 wt. % of a blending aid to facilitate uniform incorporation of the filler in the impact copolymer/plastomer polymer matrix and insure production of a homogeneous blend. Conventional blending aids can be employed for this purpose. Examples of useful blending aids include maleated polypropylenes; silanes; neoalkoxy titanates; fatty acid derivatives, such as metal soaps, amides and esters; low molecular weight aliphatic resins; and the like. Many of these additives have multiple functions and may also function as processing aids, compatibilizing agents, slip agents, lubricants, mold release agents, etc. for the resulting compositions. In one highly useful embodiment of the invention the blending agent is a blend of a fatty acid metal soap and an amide. Blending aids of this type are commercially available. One such product is STRUKTOL® TR016.

The ethylene-propylene copolymer, plastomer, filler and any optional additives may be combined and blended using conventional procedures. The blends may be used as such; however, in a highly useful and preferred embodiment of the invention the blends are visbroken. Visbreaking is the controlled degradation of the propylene polymers using chemical and/or thermal means to increase the MFR and improve processability. Visbreaking procedures are described in U.S. Pat. Nos. 3,144,436; 3,940,379 and 4,061,694 which are incorporated herein by reference.

Both chemical and thermal visbreaking involve working the blend containing all of the components at an elevated temperature in a suitable mixer which imparts shear. Single or twin screw extruders, Banbury mixers and the like are commonly used. The operations are typically carried out until the desired melt flow rate is achieved. In batch operations, for example, the operation will be carried out for a period of time sufficient to effect the desired melt flow rate increase. In continuous operations such as where extruders are used to bring about the visbreaking, residence times can be varied or multiple passes can be made.

Thermal visbreaking is generally carried out at temperatures in excess of about 550° F. in the absence of free radical initiators. For chemical visbreaking about 50 up to about 2000 ppm free radical initiator, such as a peroxide, hydroperoxide, azo or diazo compound, is included with the polymer. Chemical visbreaking is carried out at a temperature above the melt point of the polymer and above the decomposition temperature of the initiator, typically from about 350° F. to 550° F.

Visbreaking is advantageously performed on impact copolymer/plastomer/filler blends whose MFR, as a result of the types and/or amounts of the particular components used, is less than 20 g/10 min. It is even more advantageously used with compositions which upon blending have MFRs less than 15 g/10 min. MFRs less than 20 g/10 min and particularly less than 15 g/10 min are generally considered to be unsuitable, or marginally suitable, for high output injection molding operations. By visbreaking, however, the MFRs of the blends can be increased to 20 g/min or higher while retaining acceptable impact and dimensional characteristics. The ability to achieve injection molding blends having MFRs from 20 to 60 g/10 min and, more preferably, in the range 25 to 50 g/10 min utilizing a wide variety of impact copolymer and plastomer components, which by themselves in the ratios employed would not yield products having acceptable flow, is highly beneficial.

The following examples illustrate the invention; however, those skilled in the art will recognize numerous variations which are within the spirit of the invention and scope of the claims.

The propylene impact copolymer used was a reactor-made mixture of propylene copolymer. The ethylene content was 8 wt. % and the MFR was 20 g/10 min. The plastomer was an ethylene-octene-1 copolymer (EG8407; DuPont Dow Elastomers) having a density of 0.87 g/cm³ and MI of 30 g/10 min. The talc was HTP Ultra10C from IMI FABI S.p.A having an average particle size of 1.1 microns. All of the blends of the invention and the comparative blends contained STRUKTOL TR016 blending aid/processing agent. STRUKTOL TR016 is a blend of fatty acid metal soap and an amide.

All of the blends were prepared by dry blending all of the components and feeding the mixture to a Berstorff twin screw extruder for visbreaking. The extruder had nine heating zones where the temperature was increased from 350° C.

in zone 1 to 380° C. in zone 9. The die temperature was 400° C. Screw speed was 130 rpm. An amount of peroxide calculated to visbreak the blend in a single pass to an MFR of approximately 35 g/10 min was injected into the extruder at the feed zone. The peroxide used was 2,5-dimethyl-2,5-di-(t-butylperoxy) hexane. The amount of peroxide used varied depending on the initial MFR of the blend, ie. the MFR of the combined blend components prior to visbreaking. The resulting visbroken products were pelletized using a conventional underwater pelletizer.

Impact strength of the blends at −30° C. were determined using the instrumented impact method of ASTM D 3763 with a Dynatup model 8250. A weight of 75 lb. pounds and speed of 2.2 m/sec were used to determine the total energy and failure mode. A total of 5 specimens were tested. The failure mode was defined as ductile (d) when the specimen deforms plastically before fracturing. The specimen is in one piece after the penetration and the load-displacement curve is symmetric. When the load goes through a maximum on the load-displacement curve and then drops to zero, the mode is defined as ductile-brittle (DB) failure. Brittle (b) failure is defined when the load falls to zero before reaching a maximum on the load-displacement curve and the sample breaks into multiple pieces. The desired types of failures are either completely ductile or a combination of ductile and ductile-brittle.

Coefficient of linear thermal expansion (CLTE) was determined in accordance with ASTM Test Method E 831. Shrinkage data were obtained by injection molding 6"×6" 0.125" thick plaques. The plaques were removed from the mold and conditioned for 24 hours under ambient conditions. The difference in size of the plaque from the mold dimensions was then determined in each direction (MD and TD). Results are reported as millimeters shrinkage per meter of material (mm/m). Shrinkage on plaques aged at 250° F. for one hour was also determined in the same manner.

EXAMPLE 1

A blend comprised of 65 wt. % of the impact copolymer, 20 wt. % of the high MI plastomer and 15 wt. % talc was prepared. The blend also contained 750 ppm blending aid. As prepared the blend had an MFR of 18 g/10 min but was visbroken to an MFR of 37 g/10 min using the above-described visbreaking procedure. Instrumented impact properties (total energy in foot-pounds), failure type, CLTE and shrinkage results are set forth in Table I.

COMPARATIVE EXAMPLE 1

A blend similar to that of Example 1 was prepared. The weight percentages of the blend components were the same as for Example 1 and the components were identical except that a low MI plastomer was substituted for the high MI plastomer of the inventive blend. The plastomer was an ethylene-octene-1 copolymer but had an MI of 0.5 g/10 min and density of 0.87 g/cm³. The blend was visbroken from an initial MFR of 9 g/10 min to a final MFR of 35 g/10 min. Test results for the comparative blend are also reported in Table I. As is evident from the data, this comparative blend not only has a lower total impact energy than the inventive blend in Example 1, it also exhibits a majority of brittle failures in the instrumented impact test. Furthermore, the comparative blend exhibits poorer dimensional stability in terms of a much higher CLTE and shrink than the blend in Example 1.

COMPARATIVE EXAMPLE 2

Another comparative blend was prepared following the procedure described for Comparative Example 1. In this case, however, the plastomer was replaced with a conventional LLDPE resin having a MI of 33 g/10 min and density of 0.925 g/cm³. The LLDPE resin was an ethylene-butene-1 copolymer. The blend was visbroken from an initial MFR of 18 g/10 min to an MFR of 37 g/10 min and the visbroken blend evaluated for physical properties, i.e. impact, CLTE and shrink. Results are reported in Table I. This blend has inferior impact performance compared to the blend in Example 1, with very low impact energy and all brittle failures in the instrumented impact test. The CLTE and shrink are also higher than those of the blend in Example 1.

EXAMPLE 2

To demonstrate the ability to vary the formulations and thus vary the balance of properties while still achieving a high flow rate, the following example is provided. For this example the same components were employed as in Example 1 except that the amounts of plastomer and talc were increased with a corresponding decrease in the amount of impact copolymer. The blend contained 50 wt. % impact copolymer, 30 wt. % plastomer and 20 wt. % talc. A blending aid (1000 ppm) was included in the blend. The blend had a MFR before visbreaking of 19 g/10 min and after visbreaking the MFR was increased to 38 g/10 min. Test results for the visbroken blend are tabulated in Table I. It can be seen that the resulting blend has extremely low shrink and CLTE while still exhibiting ductile behavior at −30° C.

EXAMPLE 3

Following the procedure of Example 1, a blend comprised of 69 wt. % impact copolymer, 20 wt. % plastomer and 11 wt. % talc was prepared. The processing aid was present at a level of 550 ppm. The blend, which had an initial MER of 19 g/10 min, was visbroken to a MFR of 32 g/10 min. Properties of the blend determined in accordance with the above-described procedures are reported in Table I. This example demonstrates the potential for light-weighting the blend by reducing the talc content, while still maintaining good dimensional stability and ductile behavior at −30° C.

TABLE I

|  | Ex 1 | Comp. 1 | Comp. 2 | Ex. 2 | Ex.3 |
| --- | --- | --- | --- | --- | --- |
| MFR(g/10 min) | 37 | 36 | 37 | 38 | 32 |
| Instrumented Impact: | | | | | |
| Total Energy | 26.51 | 21.4 | 3.47 | 25.1 | 32.2 |
| Failure Mode | 3D/2B | 0D/5B | 0D/5B | 5D/0B | 5D/0B |
| CLTE | 58.9 | 77.8 | 63.3 | 48.1 | 60.5 |
| Ambient Shrink (MD) | 6.02 | 8.84 | 10.88 | 2.29 | 6.24 |
| Ambient Shrink (TD) | 8.75 | 11.52 | 13.93 | 3.92 | 7.76 |
| Aged Shrink (MD) | 6.43 | 8.39 | 9.28 | 2.28 | 7.77 |
| Aged Shrink(TD) | 8.02 | 10.08 | 11.84 | 3.23 | 9.56 |

As shown in the above examples, the high flow blends of the invention display an optimum balance of dimensional stability as evidenced by the low CLTE values as well as favorable performance in low temperature instrumented impact testing. The examples further demonstrate that, contrary to what has previously been reported in the prior art, it is not necessary to increase filler content to lower CLTE. The use of a high MI plastomer can be advantageously used to achieve a similar result.

I claim:

1. A propylene polymer composition having an MFR from 20 to 60 g/10 min consisting essentially of:
   a) 45 to 90 wt. %, based on the total composition, propylene-ethylene impact copolymer comprised of crystalline and amorphous phases, said impact copolymer having an ethylene content from 5 to 25 wt. % and MFR from 15 to 40 g/10 min;
   b) 5 to 35 wt. %, based on the total composition, ethylene-$C_{4-8}\alpha$-olefin plastomer, said plastomer having a density less than 0.92 g/cm$^3$ and MI from 15 to 40 g/10 min;
   c) 5 to 40 wt. %, based on the total composition, mineral filler; and
   d) 0.01 to 2.5 wt. %, based on the total composition, blending aid.

2. The composition of claim 1 wherein the blending aid is selected from the group consisting of maleated polypropylenes, silanes, neoalkoxy titanates, fatty acid metal soaps, fatty acid amides, fatty acid esters and low molecular weight aliphatic resins.

3. The composition of claim 2 wherein the blending aid is present in an amount from 0.01 to 1 wt. %.

4. The composition of claim 3 wherein the blending aid is a blend of fatty acid metal soap and fatty acid amide.

5. The composition of claim 1 which is visbroken from an original MFR of less than 20 g/10 min to an MFR of 20 to 60 g/10 min.

6. The composition of claim 5 which is visbroken to an MFR of 25 to 50 g/10 min.

7. The composition of claim 5 containing 55 to 75 wt. % propylene-ethylene impact copolymer, 10 to 30 wt. % plastomer, 10 to 25 wt. % talc and 0.01 to 1 wt. % blending aid.

8. The composition of claim 7 wherein the talc has an average particle size from about 0.5 to 10 microns.

9. The composition of claim 7 wherein the propylene-ethylene impact copolymer has an ethylene content from 6 to 22 wt. % and MFR from 15 to 40 g/10 min.

10. The composition of claim 9 wherein the propylene-ethylene impact copolymer is a reactor-made intimate mixture of propylene homopolymer and propylene-ethylene copolymer.

11. The composition of claim 7 wherein the plastomer has a density from 0.86 to 0.90 g/cm$^3$ and MI from 20 to 40 g/10 min.

12. The composition of claim 11 wherein the plastomer is an ethylene-octene-1 copolymer.

* * * * *

UNITED STATES PATENT AND TRADEMARK OFFICE
CERTIFICATE OF CORRECTION

PATENT NO. : 6,803,421 B2
DATED : October 12, 2004
INVENTOR(S) : Sebastian Joseph It is certified that error appears in the above-identified patent and that said Letters Patent is hereby corrected as shown below:

Title page,
Item [73], Assingee, "Equister Chemicals, LP" should read -- Equistar Chemicals, LP --

Signed and Sealed this

Fourth Day of January, 2005

JON W. DUDAS
*Director of the United States Patent and Trademark Office*